March 13, 1945. J. G. HAWLEY 2,371,168
BRAKE
Filed March 29, 1940 2 Sheets-Sheet 1
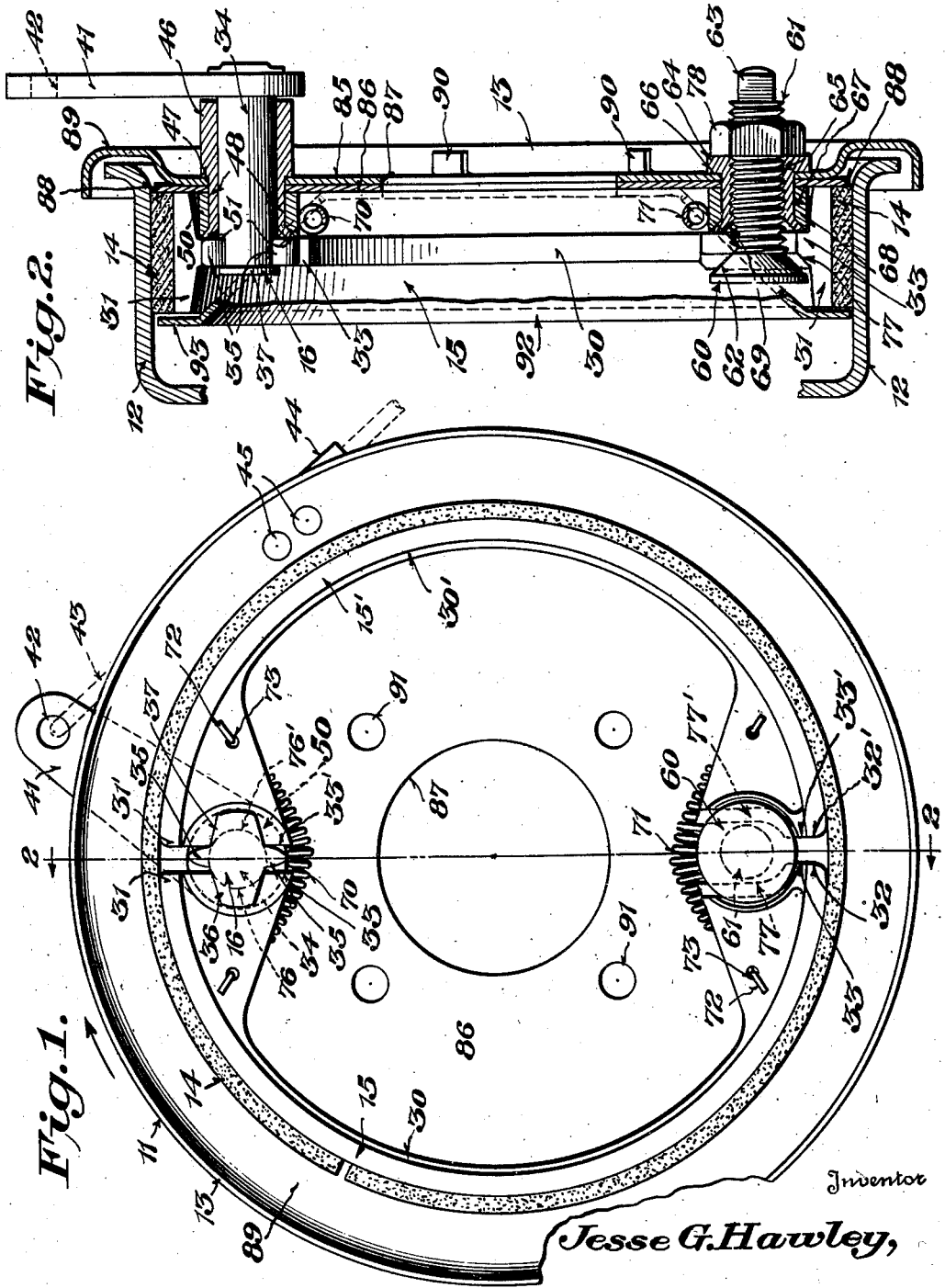
Inventor
Jesse G. Hawley,
By Albert T. StClair
Attorney

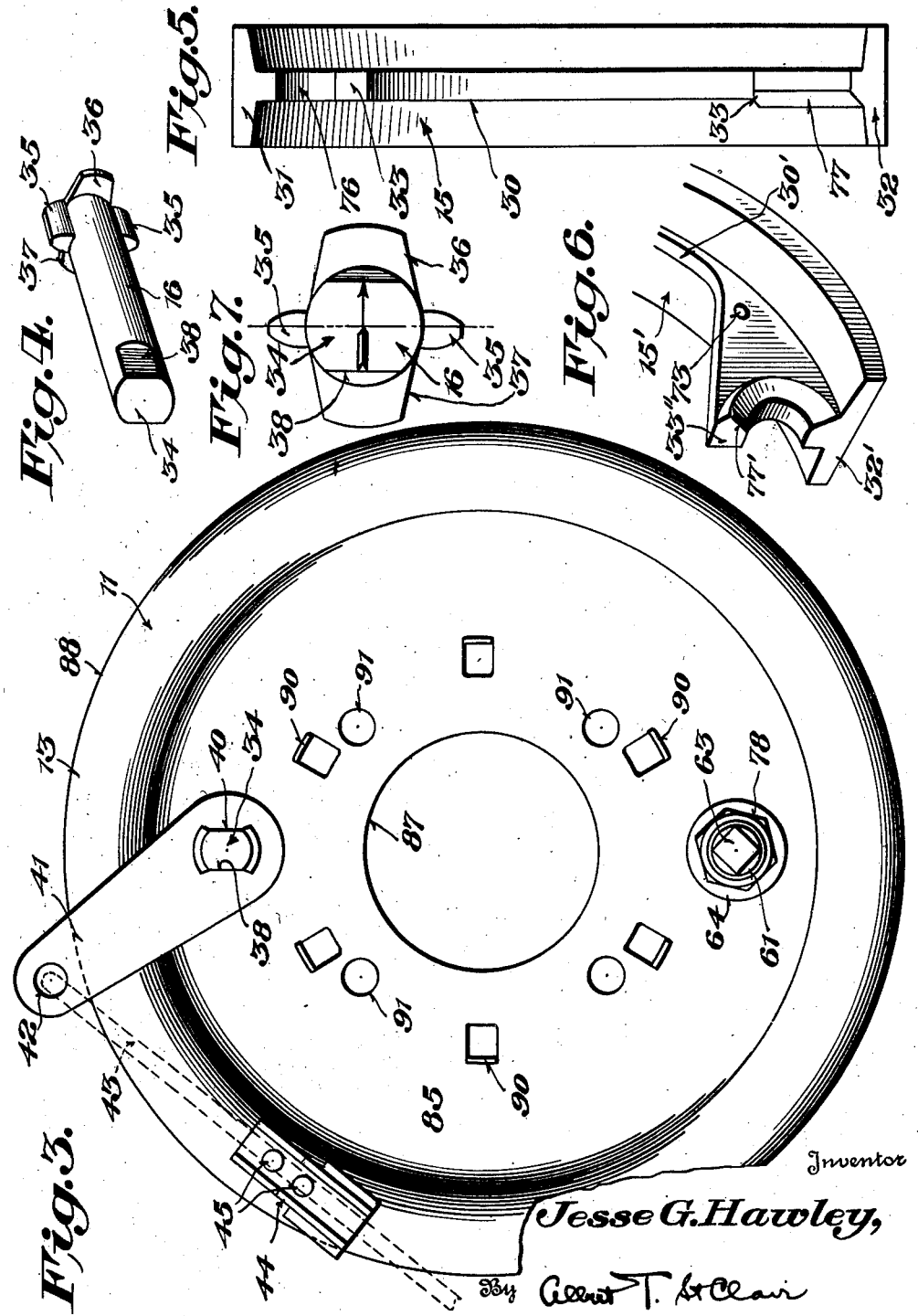

Patented Mar. 13, 1945

2,371,168

UNITED STATES PATENT OFFICE 2,371,168

BRAKE

Jesse G. Hawley, Painted Post, N. Y.

Application March 29, 1940, Serial No. 326,577

5 Claims. (Cl. 188—78)

This invention relates to the art of brakes, and more particularly to the art of internally expanding brakes.

I have invented a simple, light-weight brake which will have a smooth, velvety application and will eliminate overheating, rattling, improper centering of the brake sections, irregular wear, and slow release, by providing a brake with full floating, semi-rigid brake shoes and a creeping brake lining, and an improved mechanism for operating the brake shoes.

It is therefore an object of this invention to provide a new and improved brake.

It is a further object to provide a simple, light-weight brake in which the entire brake applying movement is achieved by an improved cam mechanism.

It is also an object to provide a brake that can be simply and easily adjusted from the exterior.

It is a still further object to provide a brake having a longer life, and in which the brake lining is free to rotate and can be replaced without removing the brake shoes.

With the above and other objects in view, which will be apparent as the discription proceeds, I have set forth my invention in the following specification and have illustrated it in the accompanying drawings, in which:

Figure 1 is a top plan view, looking down on the brake with the drum and brake lining retainer removed;

Fig. 2 is a vertical transverse section through my brake, on the line 2—2 of Fig. 1;

Fig. 3 is a bottom plan view of my improved brake;

Fig. 4 is a perspective view of my new cam;

Fig. 5 is an inside elevation of one of my brake shoes;

Fig. 6 is a perspective view of one end of a modified form of brake shoe; and

Fig. 7 is a bottom plan view of my new cam.

Referring to the accompanying drawings, and particularly to Figs. 1 and 2, my brake 11, which is illustrated as the right rear brake, preferably comprises a drum 12, a fixed brake cover 13, a creeping brake lining 14, a pair of full floating, semi-rigid brake shoes 15, 15', and a cam member 16 for forcing the brake shoes into contact with the brake lining 14 when the brake is to be applied and for permitting their withdrawal therefrom immediately upon releasing the brake.

The drum 12 is preferably secured to a wheel (not shown), and the brake cover 13 is secured to an axle housing (not shown), in the usual way.

In the preferred embodiment of my invention, each brake shoe 15, 15' is a semi-rigid member provided with intermediate portions 30, 30', respectively, and end portions 31, 32 and 31', 32', respectively. The brake shoes are also provided with bosses 33, 33' adjacent the ends of the shoes 15, 15', respectively, said bosses being centrally disposed transversely of the edges of the brake shoes and terminating in the plane of the ends 31, 32 and 31', 32', respectively. Bosses 33, 33' are also recessed for cooperation with adjacent parts, as explained below. As indicated in Fig. 1, the extreme outer portions of ends 31, 31', 32, and 32' are rounded to prevent gouging the brake lining 14.

A particular feature of my improved brake is the cam member 16 and the manner in which this cooperates with the brake shoes 15, 15'.

My improved cam member 16, as best shown in Figs. 2, 4, and 7, preferably comprises a cylindrical shaft 34 which is provided with narrow, tapering, operating ribs 35 arranged on opposite sides near one end of the shaft, and with retaining flanges 36, 37 diametrically disposed on opposite sides of said shaft between the ribs 35. The flanges 36, 37 are thin lengthwise of the shaft 34 and merely serve to overlie the adjacent portions of the bosses 33, 33', on brake shoes 15, 15', and prevent the transverse displacement of the cam member 16 with respect to the brake shoes.

As best shown in Fig. 1, the ribs 35 are offset to the right of the center line of the shaft 34, in a plan view of the cam, so that when the cam is turned clockwise, for example, the upper rib 35 will immediately exert pressure against the adjacent portion of boss 33' on shoe 15', but the lower rib 35 will not immediately exert pressure on the adjacent portion of boss 33 of shoe 15. If the cam were reversed 180°, exactly the opposite action would be obtained. This offsetting of ribs 35 compensates for the fact that the upper rib 35 is farther away from the pivotal support 60, described below, than the lower rib 35. In a preferred embodiment of my invention, the clearance between the end 31 of brake shoe 15 and the ribs 35 is 1/32" when the slot between the ends 31 and 31' is 1/16" and the maximum width of the cam ribs 35 is 3/32".

When the cam member 16 is turned clockwise to apply the brake, with the wheel rotating in the direction of the arrow in Fig. 1, the initial turning movement causes the upper rib 35 to immediately bear against the upper side of the end of boss 33' on shoe 15' and, after the cam member 16 is turned further, the lower rib 35 bears against the lower side of the boss 33 on shoe 15. This causes the other sides of the bosses 33, 33' to ride on the cylindrical portion of shaft 34. This outward movement of the ends 31, 31' of the brake shoes forces them against brake lining 14, which, in turn, is forced against the drum 12 and braking action is secured.

It will be apparent that my brake is operative for both forward and backward movement of the vehicle.

At its opposite end, shaft 34 of cam 16 is provided with flattened sides 38 (see Figs. 3, 4, and 7) for engagement with a corresponding slot 40, in an operating lever 41. As shown in Figs. 1—3, this preferably comprises a flat tapering metal bar provided at its opposite end with an aperture 42 to receive an operating cable 43 that is guided through a cable clamp 44, secured to the brake cover 13 in any desired way, as by rivets 45.

Cam member 16 is spaced in proper relation to brake cover 13 and the brake shoes 15, 15' by a cam shaft bushing 46, shown in Fig. 2. The latter is a hollow metal cylinder provided with a shoulder 47 for engagement with the outer side of brake cover 13, and a reduced diameter portion 48 for insertion through said brake cover 13 and a cylindrical spacer 50 arranged inside the brake cover. Cam shaft bushing 46 is retained in position in brake cover 13 and spacer 50 by upsetting the inner end 51 of the reduced diameter portion 48 of the bushing 46 so it will overlie and firmly engage the inner end of the spacer 50, thus locking these parts to the brake cover 13.

At their opposite ends 32, 32', the brake shoes 15, 15' are provided with an adjustable pivotal support by means of a taper-headed adjusting screw 60, shown in Fig. 2. This is provided with threads 61 except at its tapered head 62 and opposite end 63, the latter preferably being a square-headed shank to facilitate adjustment. The taper-headed adjusting screw 60 is received in an internally threaded adjusting screw bushing 64, corresponding in general with the cam shaft bushing 46, but being shorter and having internal threads 65. The adjusting screw bushing 64 is provided with a corresponding shoulder 66 and a reduced diameter portion 67 which is telescoped through the brake cover 13 and a cylindrical spacer 68. These parts are firmly held in contact with the brake cover 13 by upsetting the inner end 69 of the reduced diameter portion 67 of the bushing 64 so it will overlie and firmly engage the inner end of the spacer 68.

The spacers 50 and 68, respectively, are preferably of a thickness corresponding to the space between the inner side of the brake cover 13 and the adjacent bosses 33, 33' so that the latter rest on the spacers.

Coil springs 70 and 71 (see Fig. 1) are provided at opposite sides of the brake to normally hold the brake shoe bosses 33, 33' in contact with cam member 16 and adjusting screw 60, respectively. These coil springs also eliminate any rattling of the brake shoes.

As shown in Figs. 1 and 2, the springs 70 and 71 bear against the spacers 50 and 68, and the ends 72 of the springs are anchored in apertures 73 in the bosses 33, 33'.

When the cam member 16 is turned to apply the brake, the ribs 35 bear against the bosses 33, 33' on ends 31, 31' of brake shoes 15, 15' and spread them apart, against the pressure of spring 70, thus forcing the brake lining 14 into contact with the interior of brake drum 12 and exerting a braking action on the vehicle. When the cam member is turned in the opposite direction, to release the brake, the spring 70 pulls the bosses 33, 33' on ends 31, 31' back into contact with the cam shaft 34.

A particular feature of the present invention is the provision of special means for adjusting the brake, for example, to make an initial adjustment or to take up wear, without disassembling any of the parts and without even removing the brake cover or drum. This is accomplished by providing the upper surfaces of the bosses 33, 33', adjacent the ends 32, 32' of the brake shoes 15, 15', with tapered upper surfaces 77, 77', respectively, against which the tapered head 62 of adjusting screw 60 is adapted to seat. When adjusting screw 60 is threaded into the adjusting screw bushing 64, and the brake shoes 15, 15' are in position, the bosses 33, 33' on the latter are held in contact with the tapered head 62 of the adjusting screw 60 by spring 71. As the adjusting screw 60 is drawn further into the adjusting screw bushing 64, by turning the square-headed end 63, the tapered head 62 will force the tapered parts 77, 77' apart, thus bringing the ends 32, 32' of the brake shoes closer to the brake lining 14 and brake drum 12. When the desired adjustment has been obtained, a nut 78, which is threaded on the portion 61 of adjusting screw 60, is tightened, thus locking the adjusting screw 60 in the desired adjustment.

I have hereinabove referred to the brake shoes 15, 15' as being semi-rigid. By this, I mean that they are subject to a slight yielding action as the brake is applied in order to allow the brake shoes to completely adjust themselves to the contour of the brake lining and brake drum, thus enabling them to have a suitable amount of self-centering action.

For convenience in manufacture, the brake cover 13 is preferably made in two parts, a dust cover 85 and a backing plate 86, both apertured at 87 to facilitate assembly with adjacent car parts (not shown). Dust cover 85 is preferably a flat plate provided with a circumferential recessed portion 89 to receive the open side of the brake drum 12. Backing plate 86 is preferably a flat member of slightly greater diameter than the flat portion of the dust cover 85 to provide a circumferential portion 88 that extends outside of the normal circle occupied by the brake shoes 15, 15' to form a bottom support for brake lining 14. Dust cover 85 is preferably provided with struck out lugs 90 for centering the brake on the rear axle housing flange (not shown).

Dust cover 85 and backing plate 86 are secured together by the bushings 46 and 64, as explained herein.

Registering apertures 91 in the backing plate 86 and dust cover 85 are used to secure the brake to the adjacent parts of the vehicle.

I also provide a brake lining retainer 92 in the form of a dish-shaped member, having a circumferential flange 93 overlying the top of brake lining 14, and provided with oppositely disposed recessed portions (not shown) to avoid interference with the cam and adjusting devices. Retainer 92 is secured to the backing plate and dust cover assembly in any desired way, as by the bolts which fasten the brake to the rear axle housing (not shown), or the spindle (not shown) in the case of the front brakes.

My improved brake is preferably assembled as follows:

Cable clamp 44 is secured to the dust cover 85 in any desired way, as by the rivets 45. Backing plate 86 and dust cover 85 are assembled by inserting the cam shaft bushing 46 through the registering orifices in the dust cover and backing plate and through the spacer 50, and the innermost end 51 of the cam shaft bushing 46 is upset against the exposed inclined edge of spacer 50, thus securely holding together the cam shaft bushing, spacer, backing plate, and dust cover.

Adjusting screw bushing 64 is then inserted through the aperture in the assembled backing plate and dust cover and through the spacer 68, and the inner end 69 of the adjusting screw bushing is upset against the exposed inclined edge of the spacer 68, thus securely locking these parts in assembled relation.

Brake shoes 15, 15' are then placed in position against the assembled backing plate 86 and dust cover 85 with the ends 31, 31' of the brake shoes adjacent to the assembled cam shaft bushing 46 and spacer 50, and the ends 32, 32' of the brake shoes adjacent to the assembled adjusting screw bushing 64 and spacer 68.

Cam member 16 is then inserted through cam shaft bushing 46 with the operating ribs 35 parallel to the ends 31, 31' of the brake shoes, and with the flanges 36, 37 on cam member 16 resting against brake shoe bosses 33, 33'. The reduced diameter portion of cam shaft 34 is then inserted in the orifice in operating lever 41 with the extreme end of cam shaft 34 projecting therethrough, after which the end of cam shaft 34 is riveted to the operating lever.

Adjusting screw 60 is then threaded into adjusting screw bushing 64 until the inclined surface 62 of the adjusting screw rests against the correspondingly inclined surfaces 77, 77' on the adjacent brake shoe bosses 33, 33'. The adjusting screw 60 is adjusted so that the gap between the adjacent ends 32, 32' of the brake shoes is sufficient to give the desired play between the brake shoes 15, 15' and the brake lining 14. A suitable distance for this gap has been found to be 1/16". Adjusting screw nut 78 is then tightened, thus securely holding the adjusting screw 60 in the desired position.

Springs 70, 71 are then inserted at the cam and adjusting screw ends, respectively, of the brake shoes, thus normally holding the bosses 33, 33' of the brake shoes against the cylindrical cam shaft 34 and the adjusting screw 60.

Brake lining 14 is then inserted loosely around brake shoes 15, 15', and brake lining retainer 92 is then inserted in the brake assembly and secured to the assembled backing plate 86 and dust cover 85 in any desired manner, as by the bolts (not shown) which pass through registering apertures 91 in the backing plate 86 and dust cover 85 and fasten the brake to the rear axle housing or the spindle. The brake is completed when drum 12, preferably carried by a wheel, is secured in position by drawing up the wheel to the desired adjustment. Operating cable 43 is attached to the aperture 42 in the operating lever 41 and is guided through the cable clamp 44.

From the above description, it will be apparent that I have developed a new and useful brake, which is simple in construction and is provided with a full floating lining, in conjunction with semi-rigid brake shoes that are not secured to any part of the brake, except the brake cover, against which they are retained through the cam member 16. This permits the brake sections to adjust themselves to the thrust of the braking operations and to insure proper centering with respect to the drum.

Since the lining is free to float, it will tend to turn as the brakes are applied, thus insuring braking action against different portions of the lining, and the use of both sides of the lining throughout its entire extent, without interference with rivets. This not only gives the brake lining a greatly increased life, but prevents overheating of adjacent metal parts.

Whenever it is desired to replace the brake lining, it is only necessary to remove the wheel, pull out the old brake lining 14, and insert a new section, without the necessity for cutting old rivets and re-riveting, as is customary with former brakes.

Furthermore, it will be apparent that by the use of my improved cam member 16 there is secured an immediate braking action without encountering any loose play as soon as cable 43 is pulled to cause the ribs 35 on the cam member to bear against the adjacent bosses 33, 33' on the brake shoes. As soon as this braking pressure is removed, by restoring the ribs 35 to their normal position, spring 70 immediately retracts the ends 31, 31' of the brake shoes so they will not exert pressure against the brake lining.

When it is necessary to adjust the brake, to secure the initial adjustment or any subsequent adjustment to compensate for wear or other factors, this can be done without removing the brake or disassembling it, by merely loosening lock nut 78 and turning the adjusting screw 60 through the medium of the square-headed shank 63, to cause the tapered head 62 to bear against the inclined boss surfaces 77, 77' and spread the end 32, 32' of the brake shoes apart. Nut 78 is then tightened to hold the brake in the desired adjustment.

As shown in Figs. 1, 2, and 5, the bosses 33, 33' on the ends 32, 32' are cut away on their inner portions so that the inclined boss surfaces 77, 77' may be parallel in the vicinity of the inner portion of the bosses 33, 33'. This prevents them from exercising any restrictive action on the ends 32, 32' of the brake shoes as these tend to seat against the brake lining. In other words, the ends 32, 32' constitute the heels of the brake shoes and the provision of the cut away portions indicated allows the heels of the brake shoes to float into full contact with the brake lining 14.

In Fig. 6, I have shown a modified form of brake shoe in which the cut away boss 33' is replaced by a boss 33'' that is not cut away and terminates in the plane of the end 32' of brake shoe 15'. This provides a closed support for the adjusting screw 60.

It will therefore be clear that I have provided a two-way brake which is quick-acting, easily adjusted from the exterior, has a long life, eliminates overheating, and gives a smooth, velvety braking action without encountering the irregular wear of the brake lining and the ridging of the drum that are characteristic of prior brakes.

Furthermore, when it is necessary to replace brake lining, this may be done by merely removing the drum and replacing the old lining by a new one without any mechanical operations.

As many apparently widely different embodiments of this invention may be made without departing from the spirit thereof, it is understood that I do not limit myself to the foregoing embodiments or description except as indicated in the following claims:

I claim:

1. In a brake, the combination of a brake drum, a plurality of brake shoes, a brake cover, a creeping brake lining, and a cam member for spreading the adjacent ends of the brake shoes into contact with the brake lining in which the brake shoes are semi-rigid members provided with bosses adjacent their meeting ends and adapted to bear against the cam member, and in which diametrically disposed ribs are provided on the adjacent portions of the cam member and are arranged to successively engage the bosses on both brake shoes to successively actuate the shoes.

2. In a brake, a cam member comprising a cylindrical shaft, spaced operating ribs disposed on opposite sides of said shaft adjacent to one end thereof, said ribs both being offset in the same direction with respect to the centerline of the cylindrical shaft and flanges arranged at right angles to said ribs in a different plane therefrom for maintaining said cam member in predetermined relation to adjacent parts.

3. In a brake, a cam member comprising a cylindrical shaft and spaced operating ribs disposed on opposite sides of said shaft adjacent to one end thereof, said ribs both being offset in the same direction with respect to the center line of the cylindrical shaft.

4. In a brake comprising a brake drum, a plurality of brake shoes, a brake cover provided with a flange to overlap the edge of the brake drum, and a creeping brake lining, the combination of a brake lining retainer plate secured to the brake cover and extending over and in close proximity to the brake lining for retaining the brake lining against transverse displacement with respect to the brake shoes.

5. In a brake, a brake drum, a creeping brake lining, and a two-part brake cover comprising a backing plate and a dust cover securely held together with the dust cover terminating in a circumferential recessed flange to receive the brake drum, and the backing plate partially overlying said circumferential flange to prevent the creeping brake lining from entering said circumferential recess.

JESSE G. HAWLEY.